United States Patent
Orband

(10) Patent No.: US 9,239,237 B2
(45) Date of Patent: Jan. 19, 2016

(54) OPTICAL ALIGNMENT APPARATUS AND METHODOLOGY FOR A VIDEO BASED METROLOGY TOOL

(71) Applicant: OPTIKOS CORPORATION, Wakefield, MA (US)

(72) Inventor: Daniel Orband, Boxford, MA (US)

(73) Assignee: OPTIKOS CORPORATION, Wakefield, MA (US)

(*) Notice: Subject to any disclaimer, the term of this patent is extended or adjusted under 35 U.S.C. 154(b) by 110 days.

(21) Appl. No.: 14/246,056

(22) Filed: Apr. 5, 2014

(65) Prior Publication Data

US 2014/0300751 A1    Oct. 9, 2014

Related U.S. Application Data

(60) Provisional application No. 61/809,755, filed on Apr. 8, 2013.

(51) Int. Cl.
*G01B 11/27*    (2006.01)
*G01M 11/02*    (2006.01)

(52) U.S. Cl.
CPC .................................. *G01B 11/272* (2013.01)

(58) Field of Classification Search
CPC ........... G01B 11/272; G01M 11/0242; G01M 11/0292; G01M 11/0257; G01M 11/0235
See application file for complete search history.

(56) References Cited

U.S. PATENT DOCUMENTS

| | | | | |
|---|---|---|---|---|
| 3,766,466 A | * | 10/1973 | Faries | H01S 3/125 372/105 |
| 4,180,325 A | * | 12/1979 | Humphrey | G01M 11/0235 356/127 |
| 5,066,120 A | * | 11/1991 | Bertrand | G01M 11/0257 356/124 |
| 5,576,780 A | * | 11/1996 | Yancey | A61B 3/103 351/209 |
| 5,661,816 A | * | 8/1997 | Fantone | G01M 11/0242 382/100 |
| 2012/0025714 A1 | * | 2/2012 | Downing, Jr. | H01S 5/02292 315/149 |
| 2013/0128333 A1 | * | 5/2013 | Agrawal | G02F 1/161 359/273 |

* cited by examiner

*Primary Examiner* — Jefferey Harold
*Assistant Examiner* — Sean Haiem
(74) *Attorney, Agent, or Firm* — Francis J. Caufield

(57) ABSTRACT

A system for quickly aligning a test optic with various components of an optical metrology tool. A collimated target is presented to a beamsplitting reference surface located on a positioning system for holding and manipulating the test optic. Video images of the target and its reflection from the reference surface are displayed for analysis and visualization so that any tilt between the reference surface and the optical axis of the collimated beam can be removed to align the test optic. After alignment, the video based system is used to quickly measure and display in real-time a variety of performance characteristics of optical components such as lenses. The metrology system is under the control of a computer which uses a windowing software program to provide the user with a graphical user interface by which the various components of the system and test lenses may be aligned and characterized.

15 Claims, 1 Drawing Sheet

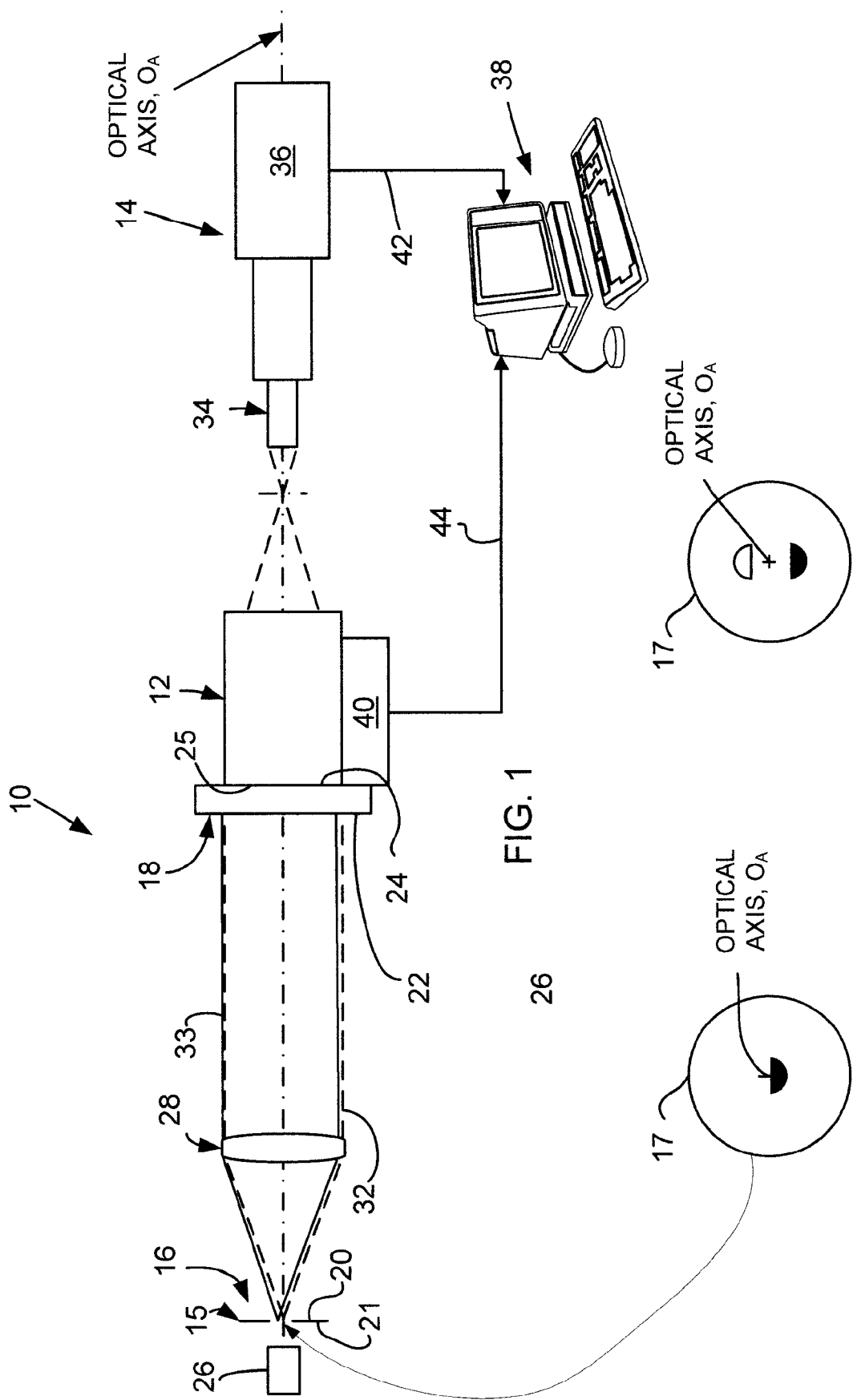

OPTICAL ALIGNMENT APPARATUS AND METHODOLOGY FOR A VIDEO BASED METROLOGY TOOL

CROSS REFERENCE TO RELATED APPLICATION

This application claims the benefit of the filing date of United States Provisional Patent Application No. 61/809,755 filed on Apr. 8, 2013 in the name of Daniel Orband and entitled "OPTICAL ALIGNMENT APPARATUS AND METHODOLOGY FOR VIDEO BASED METROLOGY TOOL", the entire contents of which are incorporated herein by reference.

BACKGROUND OF THE INVENTION

1. Field of the Invention

This invention generally relates to optical metrology apparatus and more particularly to apparatus and methodology for aligning an image forming optical system to a video metrology tool.

2. Background of the Prior Art

To properly measure an optical system, one needs to bring its optical axis into alignment with the optical axis of a collimated beam provided in the metrology tool. While this requirement is easily stated, co-alignment of the optical axes of the test instrument and the unit under test (UUT) is usually an awkward and time consuming process in practice, typically achieved by putting a mirror on a reference surface of the UUT and attempting to reflect the incident collimated beam back onto the collimator target. The return image formed at the target is usually difficult to see even at visible wavelengths and is not visible to the human eye if in the infrared or deep ultraviolet.

Well-known metrology instruments contain a light source, test target, refractive or reflective collimator, and an image analyzer. The image analyzer is generally comprised of a relay lens and two-dimensional video sensor, such as a CCD camera for the visible spectrum or microbolometer for the long-wave infrared (LWIR) spectrum. The optical system to be tested (unit-under-test or UUT) forms an image of the illuminated test target at an infinite conjugate. The image analyzer captures this image for analysis to determine properties and qualities of the UUT. An example of such instruments is described in detail in U.S. Pat. No. 5,661,816 which issued on Aug. 26, 1997 in the name of Stephen D. Fantone, et al. with the title "IMAGE ANALYSIS SYSTEM."

To properly characterize the properties of a UUT with a metrology tool requires that it be aligned with the collimated beam of the metrology tool such that there is no tilt between the optical axes of the UUT and that of the metrology tool.

Accordingly, it is a primary object of the present invention to provide alignment apparatus and methodology by which an optical component to be measured in a video based metrology instrument can readily be aligned with respect to the other components comprising the system.

Other objects will be obvious and others will appear hereinafter when the following detailed description is read in connection with the accompanying drawings.

SUMMARY OF THE INVENTION

This invention applies to metrology instruments that contain a light source, test target, refractive or reflective collimator, and an image analyzer. The image analyzer is generally comprised of a relay lens and two-dimensional video sensor, such as a CCD camera for the visible spectrum or microbolometer for the long-wave infrared (LWIR) spectrum. The optical system to be tested (unit-under-test or UUT) forms an image of the illuminated test target at an infinite conjugate. The image analyzer captures this image for analysis to determine properties and qualities of the UUT. An example of such instruments is described in detail in U.S. Pat. No. 5,661,816 which issued on Aug. 26, 1997 in the name of Stephen D. Fantone, et al. with the title "IMAGE ANALYSIS SYSTEM."

The present invention comprises apparatus for quickly aligning a test optic with various components of the above-described optical metrology tool. Here, a collimated target is presented to a reference surface located on a positioning system for holding and manipulating the test optic. Video images of the target and its reflection from the reference surface are displayed for analysis and visualization so that any tilt or other misalignment between the reference surface and the optical axis of the collimated beam can be removed to align the test optic. After alignment, the video based system is used to quickly measure and display in real-time a variety of performance characteristics of optical components such as lenses. The metrology system is under the control of a computer which uses a windowing software program to provide the user with a graphical user interface by which the various components of the system and test lenses may be aligned and characterized.

BRIEF DESCRIPTION OF THE DRAWINGS

The structure, operation, and methodology of the invention, together with other objects and advantages thereof, may best be understood by reading the detailed description in connection with the drawings in which each part has an assigned numeral or label that identifies it wherever it appears in the various drawings and wherein:

FIG. 1 is a diagrammatic elevational view of an embodiment of an alignment apparatus in accordance with the invention;

FIG. 2A is a diagrammatic representation of an image of a target formed directly by a video camera; and FIG. 2B is a diagrammatic representation of the image of FIG. 2A and its image after having been reflected by a reference surface as an inverted and reverted image (white) of the target image (black).

DETAILED DESCRIPTION OF THE INVENTION

Reference is now made to FIG. 1 which diagrammatically shows an elevational view of the alignment apparatus 10 of the invention by which a unit under test 12 (UUT), such as a lens or the like, may be aligned prior to measurement in a video based metrology system 14 of the type described more fully in the aforementioned U.S. Pat. No. 5,661,816, which is incorporated herein in its entirety by reference. The present apparatus 10 and its associated alignment method require a specific type of alignment target 16 and a plane parallel beamsplitter 18. The alignment target 16 should contain fine, transparent features, such as a crosshair, half circle, pinhole, or the like, placed against a reflective background.

A target shown generally at 16 is preferably a flat opaque disk 15 with a transparent pattern in the form of a central pinhole or cross hair, or the like, that provides features allowing visualization of an axis or alignment center. The disk 15 has two sides, a front side 21 facing a light source 26 and reflective back side 20 facing a collimating lens 28. The back side 20 of the disk 15 is usually coated with a material to increase the reflectivity of the disk 15. If the disk 15 is uncoated, then the reflectivity and surface finish of the disk 15 determine the specularity of the reflection of the light that was directed back towards the target 16 by beamsplitter 18 and focused onto the back side 20 of the disk 15 by the collimating lens 28, as more fully explained hereafter.

If the diffuseness and or reflectivity of the disk 15 substrate is insufficient, then it is advantageous to coat the back side 20 of the disk 15 with a coating that will enhance its reflectivity. There are a number of ways this can be accomplished including, white paint, retro-reflective paint, and evaporated coatings such as Inconel®, chrome, aluminum, silver or gold. Each of these ways has its own advantage. For instance, a diffuse coating, such as white paint, ensures broad band reflection and truly diffuse reflection. The diffuseness of reflection is particularly important if the pupil of the beamsplitter 18 and lens under test 12 are decentered in the pupil of the collimator lens 28. A retroreflective paint increases the amount of light that is directed directly back into the pupil of the beamsplitter 18 and lens under test 12. The effectiveness of retro-reflective paints in increasing the amount of light directed back to its source is readily appreciated when comparing the improvement in road side signs coated with retroreflective paints with those with conventional paints.

Targets are typically made of metal foil substrates using well-known techniques including laser cutting or chemical etching and other photolithographic techniques. Targets can be made on clear glass or other transmissive substrates coated with a substantially opaque coating such as aluminum, Inconel®, chrome, gold or other metal. It is important that this coating have an optical density of at least four to minimize any stray light passing through the system, as is usually required for accurate measurement of modulation transfer function.

For the visible region or operating wavelengths, a crosshair with a pinhole in the center (chrome on glass) has been found successful and for operation in the infrared region of the spectrum, a quarter-open fishtail target (tungsten foil) has been used. Alternatively, in the infrared one option is a fishtail or pinhole target on a infrared transmissive substrate.

If the target 16 is made with a substrate that has a smooth specular surface and if the pupil of the beamsplitter 18 and lens under test 12 are decentered relative to that of the collimator lens 28, the light specularly reflected off the back side 20 of the target 16 may not be reflected back into the pupil of the beamsplitter 18 and the lens under test 12. In this case, it is essential to use either a diffuse reflective coating (e.g., white paint)) or a retro-reflective paint. It is a primary intent of this coating to maximize the light reflected off the back 20 of the disk back into the pupil of the lens under test 12.

Care must be taken to make sure that any coatings on the back side 20 of the disk 15 do not encroach on the target itself and vignette the view of the target from the collimating lens 28.

The front side 21 of the target 16 may be coated with a reflective material to minimize the absorption of light and the associated rise in temperature of the target 16.

The alignment target 16 can also serve as the primary test target for the metrology tool or is aligned to other test targets in the system through means of a target wheel or mechanical fixturing of the target mounts (not shown, but otherwise well-known).

The plane parallel beamsplitter 18 generally requires parallelism of its two surfaces 22 and 24 within 1 arc minute. For the visible spectrum, the beamsplitter 18 can be fabricated from optical glass containing a partially reflective coating on one side. For the long-wave infrared spectrum, the beamsplitter 18 can be fabricated from an infrared material containing a partially reflective coating or an uncoated piece of germanium.

A light source 26 back-illuminates the alignment target 16, such that bright features on a dark background are present. The alignment target 16 is located at the focal point of the collimator lens 28. The plane parallel beamsplitter surface 24 is placed against a mechanical surface datum 25 on the front of UUT 12.

Collimated light 32 exiting the collimator lens 28 is first incident to the beamsplitter 18. Some percentage of the light transmits through the beamsplitter 18 and some percentage reflects off the beamsplitter 18 back towards the target 16, i.e., it is specularly reflected off the beamsplitter. The portion that transmits through the beamsplitter 18 is imaged by the UUT 12 and captured by the image analyzer 14 comprising a relay optic 34 and downstream camera 36 whose images are processed in a well-known manner via computer a computer 38 provided with programs containing suitable algorithms. This image of the alignment target 16 serves as our lens 28 and is reimaged onto the alignment target 16. Since the alignment target 16 contains a reflective background (surface 20), this image is reflected back through the collimator 18 and imaged by the UUT 12. A second alignment target image is captured by the image analyzer 14 and is depicted as the white or empty semicircle shown in FIG. 2B along with the previously described black reference semicircle. Only when the UUT 12 is aligned to the optical axis of the collimator lens 28 will the two alignment target images be coincident. In FIG. 2B, the two images are vertically displaced with respect to the optical axis to depict a tilt between the optical axis of the UUT and that of the collimated beam. When no such tilt exists, the two half circle images would have their bases coincident to form a perfect circle centered on the optical axis of the collimator. The sensitivity of this alignment method is dependent upon the size of the features in the alignment target 16, the focal lengths of the collimator and UUT, the magnification of the relay lens 34 in the image analyzer 14, and the resolution of the camera in the image analyzer.

To bring the two images into alignment, use may be made of a manually adjustable multi-degree of freedom precision stage or a computer controlled micromanipulator as designated generally at 40. If the later, control signals and processing information may be communicated to computer 38 with a suitable cable 44 or via wireless connections. Computer 38 may also be used to identify the UUT 12 properties, issue commands, acquire and process data, and perform routine housekeeping functions. The metrology system may also be under the control of computer 38 which preferably uses a windowing software program to provide the user with a graphical user interface by which the various components of the system and test lenses may be aligned and characterized.

The method of the invention can also be used to align purely mechanical mounts. For this purpose, the relay lens 34 in the image analyzer 14 is replaced with a decollimating lens such that the alignment target 16 is directly imaged onto the video sensor of camera 36 without the UUT 12 in place. In this case, the plane parallel beamsplitter 18 is placed against the surface datum on the mount. The procedure for viewing and aligning the two alignment target images is the same.

Procedurally, the plane parallel beamsplitter 18 is placed against a reference surface 25 on the lens that should be perpendicular to the optical axis of the lens. Light incident on the plane parallel beamsplitter 18 passes through it undeviated while light reflected off one or more surfaces of the plane parallel beamsplitter 18 is reflected back onto the target 16. Due to the symmetry of the system, the image formed is inverted and is further displaced by an amount proportional to the tilt of the reference surface 25 relative to the direction of the optical axis of the collimated beam 32.

If the UUT 12 and the plane parallel beamsplitter 18 are aligned so that the original target and the inverted and reverted image of that target are adjacent to each other, then the optical axis of the collimated beam is at the geometric center+of the two images (See bottom left white half circle above black half circle in FIG. 2B.

This procedure works very well with video based type systems such as that shown and described in the '816 patent. It is also particularly useful in the infra-red where it is usually very difficult to determine the direction of the collimated beam. The use of a target that has a reflective surround allows the user to have a direct view of the target and a view of the inverted return image from the beamsplitter 18. This makes alignment of the UUT 12 to the optical axis of the collimator 28 very easy to perform. One useful beamsplitter for use in the visible had a reflection/transmission ratio of 70/30, and an uncoated germanium window that was used for the infrared beamsplitter had an effective 60/40 ratio from Fresnel reflections.

In the visible, a plane parallel piece of common glass can be used, but the low refractive index makes the inverted and reverted image difficult to see. This image can be enhanced by applying a reflective coating to one side of the plane parallel beamsplitter 18. The relative brightness of the direct viewed target to the reflected image is:

$$T_b/(R_b \times R_t \times T_b)$$

Which is equal to $1/(R_b \times R_t)$
where $T_b$ is the single pass transmission of the beamsplitter, $R_b$ is the reflectance of the beamsplitter, and $R_t$ is the reflectance of the target surround in the target.

Note that if a non-absorbing beamsplitter is used, $R_b=1-T_b$. To a first approximation, assume the second surface of the beamsplitter is antireflection coated with a transmission of 100%. In this case, the relative brightness of the two images is $1/R_b$, so that to match the brightness of the two images, the beamsplitter reflectance should be high. Unfortunately, the overall throughput would drop. Generally, a ratio of 10:1 works, so a reflectance of 10% provides sufficient light to be able to see the reflected target. Note that if the beamsplitter is truly parallel, then you can use the reflection from both surfaces for alignment. With common optical glasses, reflectivities of 4% per surface are common, so an uncoated beamsplitter can be used. In the infra-red, much higher refractive materials are common, and they provide even better reflection than low index glasses.

The source 26 for illuminating target 16 may be any well-known source whose output encompasses the operating wavelengths of the UUT 12 under test.

Other variants of the invention are possible, and those skilled in the relevant arts may make such changes based on the teachings of the disclosure. It is intended that all such variants be within the scope of the claimed invention.

What is claimed is:

1. Apparatus for testing optical components in real-time, said apparatus having an optical axis and elements arranged thereon comprising:
   a plane parallel beamsplitter positioned along the optical axis and having a reflective surface and a reference surface;
   a manipulator for holding and positioning an optical component for testing so that a reference surface thereof can be placed in contact with said beamsplitter reference surface and moved with respect to the optical axis;
   a target positioned along the optical axis, said target comprising a flat opaque disk having a central transmissive pattern surrounded by a background that is at least partially reflective and faces said reflective surface of said beamsplitter;
   a source for illuminating said target; and
   a collimator for forming a collimated image of said target for presentation to said optical component such that said collimated image is partially reflected by said reflective beamsplitter surface back through said collimated lens and onto said reflective background of said target after which it is reflected for travel through said optical component as a retroreflected image of said target and partially transmitted by said beamsplitter to be formed by said optical component as a direct image of said target, said direct and retroreflected images being inverted and reverted about said optical axis with respect to one another with the separation between them being proportional to any misalignment between said optical component reference surface and the optical axis of said collimated image; and
   a video analyzer for viewing said direct and retroreflected images of said target so that the optical component can be aligned with the optical axis of said collimated image.

2. The apparatus of claim 1 wherein said flat opaque disk comprises a metal foil.

3. The apparatus of claim 1 wherein said flat opaque disk comprises a transmissive material having a opaque coating having a optical density of at least 4.

4. The apparatus of claim 3 wherein said background is coated to enhance its reflectivity.

5. The apparatus of claim 2 wherein said background is coated with a material selected from the group comprising white paint, retroreflective paint, and evaporated coatings.

6. The apparatus of claim 5 wherein said evaporated coatings are selected from the group comprising gold, protected silver, inconel®, chrome, and aluminum.

7. The apparatus of claim 1 wherein said transmissive pattern is selected from the group comprising pinholes, pinholes with cross hairs, semi-circles, and fish tails.

8. The apparatus of claim 3 wherein said transmissive material comprises glass or glass-like materials.

9. The apparatus of claim 1 wherein said beamsplitter surfaces are parallel to within one (1) arc minute.

10. The apparatus of claim 9 wherein said beamsplitter comprises plane parallel glass wherein said reflective surface comprises a reflective coating.

11. The apparatus of claim 10 wherein the relative brightness between said direct and retroreflective images is given by:

$$T_b/(R_b \times R_t \times T_b)$$

where $T_b$ is the single pass transmission of said beamsplitter, $R_b$ is the reflectance of said beamsplitter, and $R_t$ is the effective reflectance of said target background.

12. The apparatus of claim 1 wherein said manipulator comprises a precision, manual, mutlti-degree of freedom, mechanical stage for adjusting the position and attitude of an optical component with respect to the optical axis of said apparatus.

13. The apparatus of claim 12 wherein said manipulator is computer controlled.

14. The apparatus of claim 1 wherein said video analyzer comprises a display that permits an operator to visualize the relative position of said images so that an operator can bring them into alignment while changing said manipulator.

15. The apparatus of claim 1 wherein said source is selected from the group whose spectral range of operation comprising the ultraviolet, visible, near, middle, and far infrared.

\* \* \* \* \*